United States Patent [19] [11] 4,315,178
Ban et al. [45] Feb. 9, 1982

[54] DIRECT CURRENT MOTOR WITH NON-SUPERPOSED ARMATURE WINDINGS

[76] Inventors: Itsuki Ban, 829 Higashi-Oizumimachi, Nerima-ku, Tokyo; Manabu Shiraki, 4451-171 Shimotsuruma, Yamato-shi, Kanagawa-ken; Kazuhito Egami, 2-44-1 Chuo, Nakano-ku, Tokyo, all of Japan

[21] Appl. No.: 146,754

[22] Filed: May 5, 1980

Related U.S. Application Data

[63] Continuation of Ser. No. 948,552, Oct. 4, 1978, abandoned.

[30] Foreign Application Priority Data

Jan. 23, 1978 [JP] Japan ................... 53-5317

[51] Int. Cl.³ ............................................. H02K 21/26
[52] U.S. Cl. ................................. 310/154; 310/198; 310/268
[58] Field of Search ...................... 310/154, 198–208, 310/268, 100–104

[56] References Cited

U.S. PATENT DOCUMENTS

| | | | |
|---|---|---|---|
| 3,239,705 | 3/1966 | Kavanaugh | 310/268 |
| 3,348,086 | 10/1967 | Mouna | 310/268 |
| 3,441,761 | 4/1969 | Painton et al. | 310/154 |
| 3,705,459 | 12/1972 | Biddison | 29/597 |
| 3,737,697 | 6/1973 | Kitamori et al. | 310/268 X |
| 3,796,899 | 3/1974 | Giachello | 310/268 X |

FOREIGN PATENT DOCUMENTS 52-121706 4/1976 Japan .

*Primary Examiner*—Donovan F. Duggan
*Attorney, Agent, or Firm*—Kenway & Jenney

[57] ABSTRACT

A direct current motor is provided with a field magnet having l(2m+2n) alternating N and S poles (l and m being positive integers of one or more and n being a positive integer of two or more) that are magnetized within segments of equiangular width about the field magnet, a magnetic-material member for closing the magnetic path of the field magnet, and an armature having l(2n−1) armature windings distributed thereon in a non-superposed manner with respect to each other and in a face-to-face relationship with respect to the field magnet poles, each winding having an angular spacing between those conductor portions thereof that contribute to the generation of the torque that is equal to the angular width of a field magnet pole.

2 Claims, 9 Drawing Figures

DIRECT CURRENT MOTOR WITH NON-SUPERPOSED ARMATURE WINDINGS

This is a continuation of application Ser. No. 948,552, filed Oct. 4, 1978, now abandoned.

BACKGROUND OF THE INVENTION

This invention relates to a direct current (DC) motor which has, for (2m+2n) field magnet poles (where m is a positive integer of 1 or more and n is a positive integer of 2 or more) (2n−1) armature windings which are disposed on a disk-shaped or cylindrical armature in a non-superposed manner with respect to each other or in a single layer.

In conventional DC motors having a plurality of armature windings, the armature windings are generally disposed on the armature in such a manner that the windings are superposed on each other in multiple layers. In the manufacture of such DC motors, substantial labor is required for processing the edge portions of the superposed armature windings, this labor requirement impeding the convenient mass production of the motors. If a plurality of armature windings are resin molded and solidified into a unit for disposition on an armature, the resultant armature assembly will have an increased thickness because the armature windings are superposed on each other in multiple layers. This increased thickness of the armature will substantially reduce the effective magnetic field which passes through the armature, thus resulting in decreases in motor efficiency and staring torque.

SUMMARY OF THE INVENTION

The above-described drawbacks in the prior art have been successfully eliminated by the present invention.

Accordingly, an object of the invention is to provide a DC motor which requires fewer armature windings, is especially suited for mass production and is low in cost.

Another object of the invention is to provide a DC motor in which the effective length of those conductor portions of the armature winding that contribute to the generation of torque is sufficiently large as compared with the length of the other portions, which contributed to the copper loss, that the efficiency of the motor is increased.

According to the invention, a DC motor is provided with a field magnet having 1 (2m+2n) poles (1 and m being each a positive integer of 1 or more and n being a positive integer of 2 or more) which are magnetized respectively into alternate N- and S-polarities in equal angular spaces, a magnetic material member for closing the magnetic path of the field magnet, 1 (2n−1) armature windings disposed on an armature each winding having, between those conductor portions thereof that contribute to the generation of torque, an angular spacing that is equal to the angular width of the field magnet pole, the armature windings disposed thereon within the magnetic path in a non-superposed fashion with respect to each other, i.e., in a single layer, and in a face-to-face relationship with respect to the field magnet, and a rotatable shaft for supporting either the armature or the field magnet for rotation, the shaft supported by bearings provided in the motor housing.

These and other objects, features and advantages of the invention will become apparent from the following description of the preferred embodiments thereof taken in conjunction with the accompanying drawings.

BRIEF DESCRIPTION OF THE DRAWINGS

FIG. 1b is a plan view diagrammatically illustrating the field magnet in the motor of FIG. 1a;

FIG. 1c is a plan view illustrating the armature in the motor of FIG. 1a;

DETAILED DESCRIPTION OF THE PREFERRED EMBODIMENTS

Figure 1A:
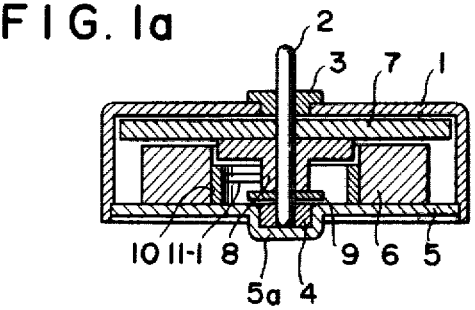
FIG. 1a is a cross sectional view schematically illustrating the construction of a DC motor of the present invention.
Figure 1B:
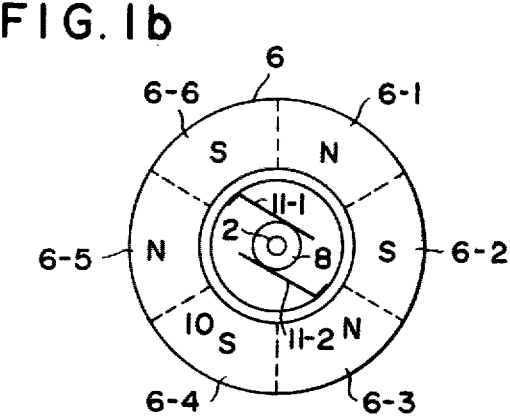
Figure 1C:
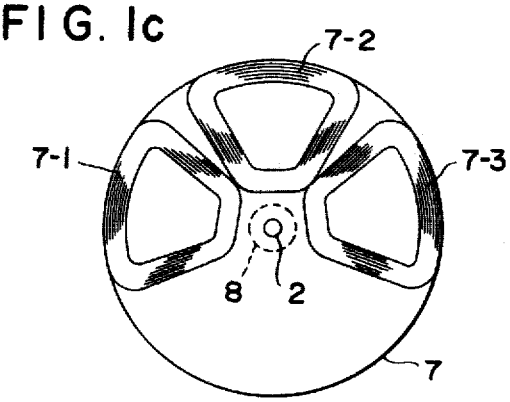

FIGS. 1a, 1b, and 1c illustrate the construction of a DC commutator motor according to the present invention which is provided with a disk-shaped armature. As shown in FIG. 1a, a disk-shaped soft steel plate 5 having a circular depression 5a formed in the central portion thereof is force fitted into the bottom portion of a cylindrical housing 1, which is made by press forming a soft steel plate. The housing 1 with the plate 5 are adapted to form and close a magnetic path. Bearings 3 and 4 are provided, respectively, in the top wall of the housing 1 and the circular depression 5a formed in the bottom plate 5. The bearings 3 and 4 support a rotatable shaft 2 with an end thereof abutting and pressing against the inner surface of the circular depression 5a. An annular field magnet 6 is coaxially secured to the inner surface of the disk-shaped soft steel plate 5. An armature 7 and an integrally molded commutator 8 is secured to the shaft 2. A washer 9, which functions as an oil shield, is attached to the shaft 2 under the commutator 8. The armature 7 is so placed that it is within the magnetic field in the air gap between the housing 1 and the field magnet 6. The field magnet 6 comprises magnetic poles 6-1, 6-2, . . . , 6-6 each subtending an angular space of 60° and are magnetized into alternate N- and S-polarities as shown in FIG. 1b. A cylindrical plastic molded member 10 is fitted in the central opening of the annular field magnet 6. Brushes 11-1 and 11-2 have their base portions secured to the inner face of the cylinder 10 and their free end portions maintained in sliding contact with the commutator 8. The armature 7 comprises, as shown in FIG. 1c, sectorial armature windings 7-1, 7-2, 7-3 which are arranged in a non-superposed fashion with respect to each other and are embedded in a plastic disk of the armature. The angular spacing between those conductor portions of each sectorial armature winding that contribute to the generation of torque is 60° which is equal to the angular width or space of each of the field magnet poles 6-1, 6-2, . . . , 6-6. With this configuration of the armature windings the radial length of the conductor portions which contribute to the generation of torque can be small as compared with the length of the outer and inner peripheries, which contribute to the copper loss, of the armature winding, thus resulting in an increased efficiency. This armature winding configuration is also desirable for increasing the efficiency of motors in which the armature windings are applied to a cylindrical armature (not shown). The illustrated armature windings of the invention constitute a three-phase armature winding assembly which are, unlike conventional three-phase armature winding assemblies that have their windings superposed on each other, the windings in accordance with the invention do not have an increased thickness because the windings are juxtaposed with respect to each other in a single plane. Accordingly, the distance between the field magnet 6 and the housing 1 (FIG. 1a) can be made relatively small allowing the magnetic field to have an increased strength, and resulting in increases in motor efficiency and torque. With the three sectorial armature windings juxtaposed with respect to each other and embedded in the plastic plate, the armature 7 is simple to manufacture and especially suited to mass production.

Figure 2:
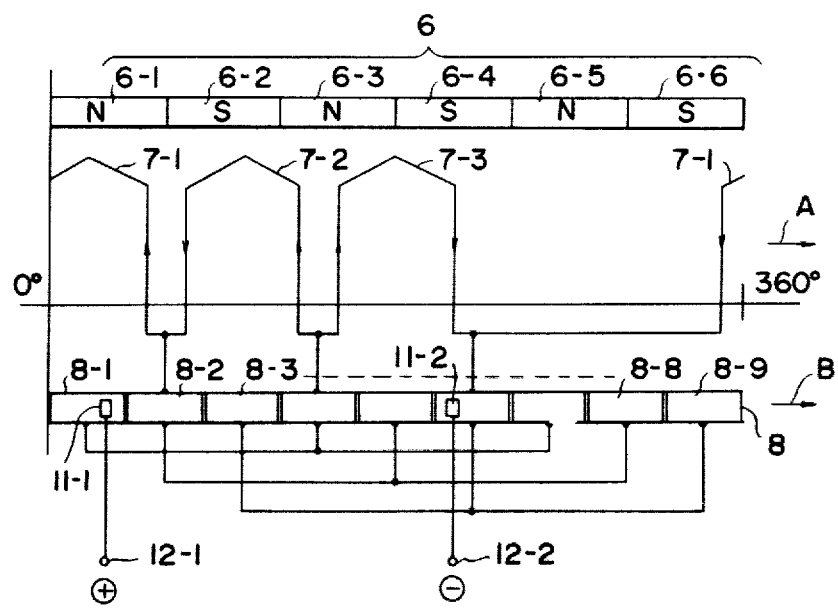
FIG. 2 is a developed view of the field magnet and the armature shown in FIG. 1.

The principle of rotation of the armature is described below in connection with the development of FIG. 2 in which the armature windings are connected in a ring fashion (Δ type). The commutator 8 comprises commutator segments 8-1, 8-2, . . . , 8-9, each subtending an angular space of 40° (⅔ of the angular width of the field magnet pole). The commutator segments 8-1, 8-4, and 8-7 are interconnected in common through a lead wire, and similarly the segments 8-2, 8-5, and 8-8, and the segments 8-3, 8-6, and 8-9 are interconnected in common through corresponding lead wires, respectively. The armature windings 7-1, 7-2, and 7-3 are arranged as follows: the windings 7-1 and 7-2 and 7-3 are disposed in this order at an angular spacing of 80° (4/3 of the angular width of the field magnet pole), with the windings 7-3 and 7-1 being disposed at an angular spacing of 200° (10/3 of the angular width of the field magnet pole), these three windings being disposed in an non-superposed fashion, i.e., in a single layer, with respect to each other. The respective junctions between the armature windings 7-1 and 7-2, between the windings 7-2 and 7-3, and between the windings 7-3 and 7-1 are connected, respectively, to the commutator segments 8-2, 8-4, and 8-6. The brushes 11-1 and 11-2 are electrically connected respectively to a positive and a negative terminals 12-1 and 12-2 of a DC supply source. In the illustrated embodiment, the brushes 11-1 and 11-2 are located with an angular spacing of 180° therebetween, while another spacing value of 60° (360°/1 (2m+2n) where 1 and m are each a positive integer of 1 or more and n is a positive integer of 2 or more, and, in this case, l=1, m=1, n=2), or of 300° may be employed as an equivalent, in principle, of the aforementioned value of 180°. In the state shown in FIG. 2, current flows in the directions indicated by the arrows, i.e., flows in parallel through the armature winding 7-3 and through the windings 7-2, 7-1 to generate torque at the respective windings, to drive the armature 7 in the direction of arrow A and cause the commutator 8 to rotate in the direction of arrow B. Upon rotation through 20°, the state of current flow changes, in direction, to parallel paths through the armature windings 7-2 and through the armature windings 7-3, 7-1, with torque being generated at the respective windings. Upon a further rotation through 20°, the state of current flow again changes to parallel paths through the armature winding 7-1 and through the armature windings 7-3, 7-2, with torque being generated at the respective windings. As can be appreciated the armature 7 and the commutator will continue to be rotated by the torque which is generated successively at the respective armature windings.

While the above-described embodiment illustrates a motor provided with a disk-shaped armature, the invention can be applied also to a motor provided with a cylindrical armature and to a commutatorless motor. In the invention, for (2m+2n) field magnet poles (where m is a positive integer of 1 or more and n is a positive integer of 2 or more) (2n-1) armature windings are employed, and each armature winding is formed to have, between those conductor portions thereof which contribute to the generation of torque, an angular spacing which is equal to the angular width of the field magnet pole. In the illustrated embodiment, m has been selected as equal to 1 and n as equal to 2. Other embodiments will be described hereinbelow in connection with FIG. 3 and the succeeding figures which illustrate developments of other examples of armatures and field magnets. Although the motors described below have armature windings that are connected in a ring fashion, it will be apparent to those skilled in the art that the invention can be applied to motors in which one end of each of the armature windings is connected in common, and, as described above, to a commutatorless motor wherein current is supplied to armature windings by means of semiconductor devices.

Figure 3:
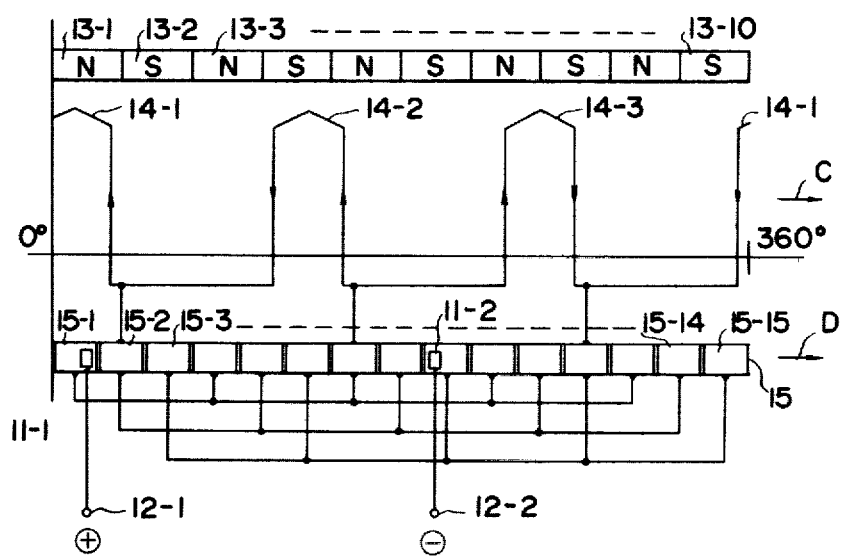
FIGS. 3, 4, 5, 6 and 7 are developed views illustrating, respectively, various other embodiments of field magnets and armatures.

FIG. 3 is the development of a motor in accordance with the present invention in which m=3 and n=2, i.e., there are ten field magnet poles and three armature windings. In FIG. 3, the numerals 13-1, 13-2, . . . , 13-10 indicate field magnet poles which are magnetized alternately into N and S poles subtending angular spaces of 36°. A commutator comprises commutator segments 15-1, 15-2, . . . , 15-15, each subtending an angular space of 24° (⅔ of the angular width or space of the field magnet pole). The commutator segments 15-1, 15-4, 15-7, 15-10, and 15-13 are interconnected in common through a lead wire, and, similarly the segments 15-2, 15-5, 15-8, 15-11, and 15-14, and the segments 15-3, 15-6, 15-9, 15-12, and 15-15 are interconnected in common through corespondings lead wires, respectively. Armature windings 14-1, 14-2, and 14-3 are arranged at equal pitches, i.e., at an angular spacing of 120°, in a non-superposed relationship to constitute the armature. The angular spacing between those conductor portions thereof that contribute to the generation of the torque is 36° and is equal to the angular width of each of the field magnet poles 13-1, 13-2, . . . , 13-10. The respective junctions between the armature windings 14-1 and 14-2, between the windings 14-2 and 14-3, and between the windings 14-3 and 14-1 are connected respectively to the commutator segments 15-2, 15-7 and 15-12. The angular spacing between the brushes 11-1 and 11-2 is 180°, while any other spacing value of 36° (360°/1 (2m+2n) wherein l=1, m=3, n=2), 108°, 252° or 324° may be employed as an equivalent, in principle, of the value of 180°.

Figure 4:
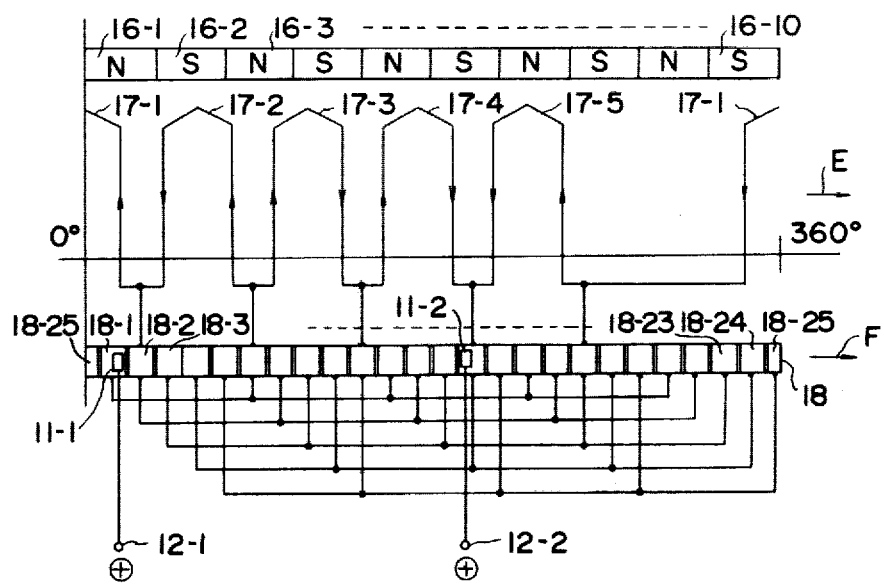

FIG. 4 illustrates the development of another motor embodiment in accordance with the present invention in which m=2 and n=3, i.e., there are ten field magnet poles and five armature windings. The numerals 16-1, 16-2, . . . , 16-10 indicate the field magnet poles which are of alternate N and S polarity each subtending an angular space of 36°. A commutator 18 comprises commutator segments 18-1, 18-2, . . . , 18-25, each subtending an angular spacing of 14.4° (2/5 of the angular width or space of the field magnet pole). The commutator segments 18-1, 18-6, 18-11, 18-16, and 18-21 are interconnected in common through a lead wire, and similarly the commutator segments 18-2, 18-7, 18-12, 18-17, and 18-22; the segments 18-3, 18-8, 18-13, 18-18, and 18-23; the segments 18-4, 18-9, 18-14, 18-19, and 18-24; and the segments 18-5, 18-10, 18-15, 18-20, and 18-25 are interconnected in common through corresponding lead wires, respectively. Armature windings 17-1, 17-2, . . . , 17-5 are arranged in a manner as shown by FIG. 4, i.e., the armature windings 17-1, 17-2, 17-3, 17-4, and 17-5 are arranged in this order at angular spacings of 57.6° (8/5 of the angular width of the field magnet pole), with the windings 17-5 and 17-1 being arranged at an angular spacing of 129.6° (18/5 of the angular width of the field magnet pole); all of the windings being arranged in a non-superposed manner with respect to each other to thereby constitute the armature. The angular spacing between those conductor portions thereof that contribute to the generation of torque is 36° which is equal to the angular width of each of the field magnet poles 16-1, 16-2, ..., 16-10. The respective junctions between the armature windings 17-1 and 17-2, between the windings 17-2 and 17-3, between the windings 17-3 and 17-4, between the windings 17-4 and 17-5, and between the windings 17-5 and 17-1 are connected respectively to the commutator segments 18-2, 18-6, 18-10, 18-14, and 18-18. The angular spacing between the brushes 11-1 and 11-2 is 180° and any other spacing value of 36° (360°/l(2m+2n) wherein l=1, m=2 and n=3), 108°, 252° or 324° may be employed as an equivalent of the value of 180° in principle. In the state shown in FIG. 4, current flows in the directions shown by arrows to generate torque at the respective armature windings to rotate the armature and the commutator 18 in the directions of arrows E and F, respectively. The current flow changes in direction with continued rotation of the commutator 18 in a similar manner as in the foregoing embodiments.

Figure 5:
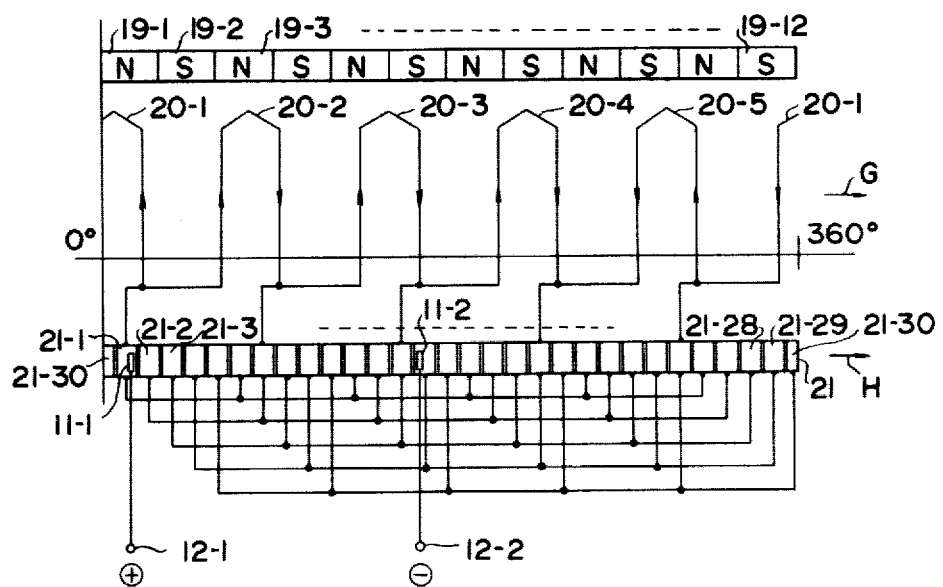

FIG. 5 illustrates the development of still another motor embodiment in accordance with the present invention in which m=3 and n=3, i.e., there are twelve field magnet poles and five armature windings. The numerals 19-1, 19-2, ..., 19-12 indicate field magnet poles which are of alternate N and S polarity subtending angular spaces of 30°. A commutator 21 comprises commutator segments 12-1, 12-2, ..., 21-30, each subtending an angular space of 12° (2/5 of the angular width or space of the field magnet pole). The commutator segments 21-1, 21-6, 21-11, 21-16, 21-21, and 21-26 are interconnected in common through a lead wire, and similarly, the commutator segments 21-2, 21-7, 21-12, 21-17, 21-22, and 21-27; the segments 21-3, 21-8, 21-13, 21-18, 21-23, and 21-28; the segments 21-4, 21-9, 21-14, 21-19, 21-24, and 21-29; and the segments 21-5, 21-10, 21-15, 21-20, 21-25, and 21-30 are interconnected in common, respectively through corresponding lead wires. Armature windings 20-1, 20-2, ..., 20-5 are arranged at equal pitches, i.e., at angular spacings of 72° (12/5 of the angular width of the field magnet pole), in a non-superposed manner to thereby constitute the armature. The angular spacing between those conductor portions of the armature windings that contribute to the generation of torque, is 30° which is equal to the angular width of each of the field magnet poles 19-1, 19-2, ..., 19-12. The respective junctions between the armature windings 20-1 and 20-2, between the windings 20-2 and 20-3, between the windings 20-3 and 20-4, between the windings 20-4 and 20-5, and between the windings 20-5 and 20-1 are connected respectively to the commutator segments 21-1, 21-7, 21-13, 21-19, and 21-25. The angular spacing between the brushes 11-1 and 11-2 is 150°, and any other spacing value of 30° (360°/l(2m+2n) wherein l=1, m=3 and n=3), 90°, 210°, 270° or 330° may be employed, in principle as an equivalent of the value of 150°. In the state shown in FIG. 5, current flows in the directions indicated by the arrows to generate torque at the respective armature windings to cause the armature and the commutator 21 to rotate in the directions of arrows G and H, respectively. The current flow changes in direction with continued rotation of the commutator 21 in a similar manner as in the foregoing embodiments.

Figure 6:
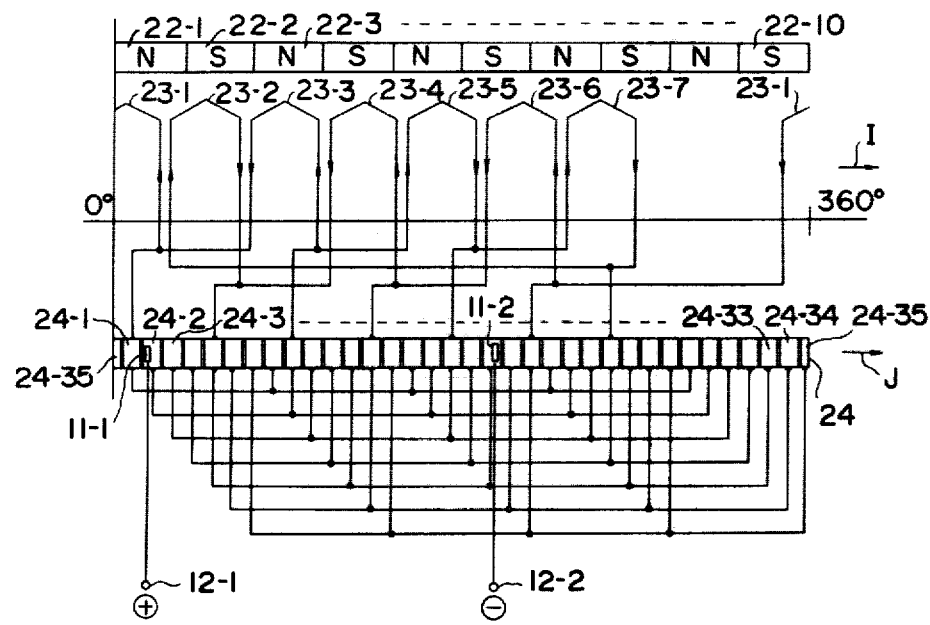

FIG. 6 illustrates the development of a still another motor embodiment in accordance with the present invention in which m=1 and n=4, i.e., there are ten field magnet poles and seven armature windings. The numerals 22-1, 22-2, ..., 22-10 indicate field magnet poles which are of alternate N and S polarity and subtending angular spaces of 36°. A commutator 24 comprises commutator segments 24-1, 24-2, ..., 24-35, each subtending an angular space of 360°/35 (about 10.3°, also being 2/7 of the angular width or space of the field magnet pole). The commutators segments 24-1, 24-8, 24-15, 24-22, and 22-29 are interconnected in common through a lead wire, and similarly, the commutator segments 24-2, 24-9, 24-16, 24-23, and 24-30; the segments 24-3, 24-10, 24-17, 24-24, and 24-31; the segments 24-4, 24-11, 24-18, 24-25, and 24-32; the segments 24-5, 24-12, 24-19, 24-26, and 24-33; the segments 24-6, 24-13, 24-20, 24-27, and 24-34; and the segments 24-7, 24-14, 24-21, 24-28, and 24-35 are interconnected in common through corresponding lead wires, respectively. Armature windings 23-1, 23-2, ..., 23-7 are arranged in the manner as shown in FIG. 6, i.e., the armature windings 23-1, 23-2, 23-3, 23-4, 23-5, 23-6, and 23-7 are arranged in this order at angular spacings of about 41.4° (8/7 of the angular width of the field magnet pole), with the windings 23-7 and 23-1 being arranged at an angular spacing of about 113.1° (22/7 of the angular width of the field magnet pole); all the windings are arranged in a non-superposed manner, to thereby constitute the armature. The angular spacing between those conductor portions of the armature windings that contribute to the generation of torque, is 36° which is equal to the angular width of each of the field magnet poles 22-1, 22-2, ..., 22-10. The respective junctions between the armature windings 23-1 and 23-3, between the windings 23-3 and 23-5, between the windings 23-5 and 23-7, between the windings 23-7 and 23-2, between the windings 23-2 and 23-4, between the windings 23-4 and 23-6, and between the windings 23-6 and 23-1 are connected respectively to the commutator segments 24-1, 24-9, 24-17, 24-25, 24-5, 24-13 and 24-21. The angular spacing between the brushes 11-1 and 11-2 is 180°, and any other value of 36° (360°/l(2m+2n) wherein l=1, m=1 and n=4), 108°, 252° or 324° may be employed as an equivalent, in principle of the value of 180°. In the state shown in FIG. 6, the current flows in the directions indicated by the arrows to generate torque at the respective armature windings to cause the armature and the commutator 24 to rotate in the directions of arrows I and J, respectively. The current flow changes in direction with additional rotation of the commutator 24 in a similar manner as in the foregoing embodiments, and thus the armature and the commutator continue to rotate.

Figure 7:
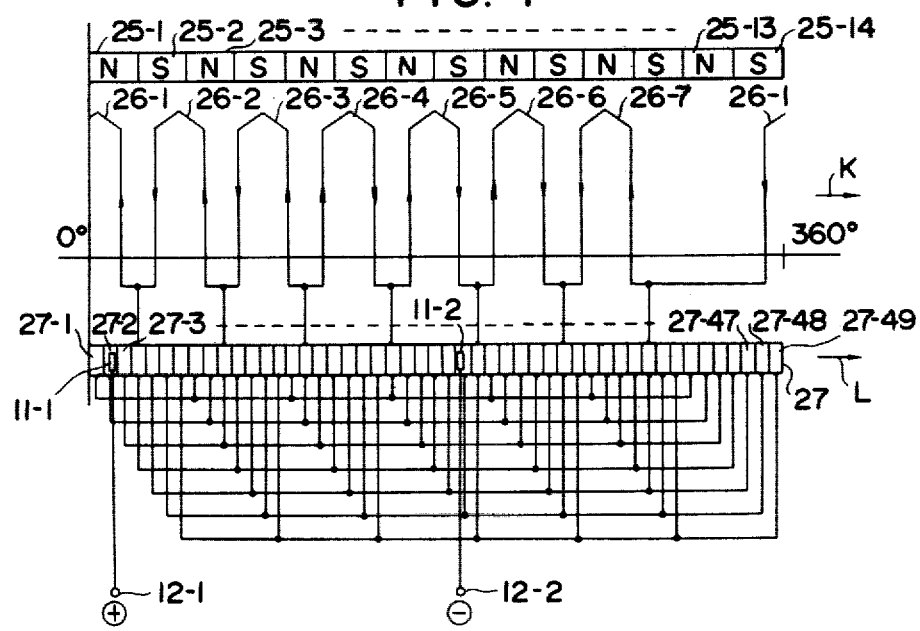

FIG. 7 illustrates the development of yet another motor embodiment in accordance with the present invention where m=3 and n=4, i.e., there are fourteen field magnet poles and seven armature windings. The numerals 25-1, 25-2, ..., 25-14 indicate the field magnet poles which are of alternate N and S polarity and which subtend angular spaces of 360°/14 (about 25.7°). A commutator 27 comprises commutator segments 27-1, 27-2, ..., 27-49, each subtending an angular space of 360°/49 (about 7.35°, also being 2/7 of the angular width or space of the field magnet pole). The commutator segments 27-1, 27-8, 27-15, 27-22, 27-29, 27-36, and 27-43 are interconnected in common through a lead wire, and similarly the commutator segments 27-2, 27-9, 27-16, 27-23, 27-30, 27-37, and 27-44; the segments 27-3, 27-10, 27-17, 27-24, 27-31, 27-38, and 27-45; the segments 27-4, 27-11, 27-18, 27-25, 27-32, 27-39, and 27-46; the segments 27-5, 27-12, 27-19, 27-26, 27-33, 27-40, 27-47; the segments 27-6, 27-13, 27-20, 27-27, 27-34, 27-41, and 27-48; and the segments 27-7, 27-14, 27-21, 27-28, 27-35, 27-42, and 27-49 are interconnected in common through corresponding lead wires, respectively. Armature windings 26-1, 26-2, ..., 26-7 are arranged in the manner shown in FIG. 7, i.e., the armature windings 26-1, 26-2, 26-3, 26-4, 26-5, 26-6, and 26-7 are arranged in this order at an angular spacing of about 44.1° (12/7 of the angular width or space of the field magnet pole), with the windings 26-7 and 26-1 being arranged at an angular spacing of about 95.5° (26/7 of the angular width of the field magnet pole); all of the armature windings are arranged in a non-superposed manner to thereby constitute the armature. The angular spacing between those conductor portions, of the armature winding that contribute to the generation of torque is 360°/14 (about 25.7°) which is equal to the angular width of each of the field magnet poles 25-1, 25-2, ..., 25-14. The respective junctions between the armature windings 26-1 and 26-2, between the windings 26-2 and 26-3, between the windings 26-3 and 26-4, between the windings 26-4 and 26-5, between the windings 26-5 and 26-6, between the windings 26-6 and 26-7, and between the windings 26-7 and 26-1 are connected respectively to the commutator segments 27-4, 27-10, 27-16, 27-22, 27-28, 27-34, and 27-40. The angular spacing between the brushes 11-1 and 11-2 is 180°, and any other value of 360°/14 (about 25.7° for 360°/l(2m+2n) wherein l=1, m=3, n=4), 3(360/14)° (about 77.1°), 5(360/14)° (about 128.6°), 9(360/14)° (about 231.4°), 11(360/14)° (about 282.9°) or 13(360/14)° (about 334.3°) may be employed as an equivalent, in principle of the value of 180°. In the state shown in FIG. 7, the current flows in the directions indicated by the arrows to generate torque at the respective armature windings to cause the armature and the commutator 27 to rotate in the directions of arrows K and L, respectively. The current flow changes in direction with additional rotation of the commutator 27 in a similar manner as in the foregoing embodiments, and thus the armature and the commutator are caused to rotate continuously.

While, in the above-described embodiments, motors have been described where the number of the field magnet poles is (2m+2n) (m being a positive integer of 1 or more and n being a positive integer of 2 or more) and the number of the armature windings is (2n−1), the invention can be applied also to the case where the number of field magnet poles is l(2m+2n) (l being a positive integer of 1 or more) and the number of armature windings is l(2n−1) (l being a positive integer of 1 or more), with the armature windings being arranged, in a non-superposed fashion with respect to each other, on a face of the armature.

Thus, there is provided in accordance with the invention a DC motor which has the advantage discussed above. The embodiments described are intended to be merely exemplary and those skilled in the art will be able to make variations and modifications in them without departing from the spirit and scope of the invention. All such modifications and variations are contemplated as falling within the scope of the claims.

What is claimed is:

1. A direct current motor having armature windings that are non-superposed with respect to each other comprising:
   a field magnet having l(2m+2n) poles that are magnetized into alternate N and S polarities in equal angular spaces wherein l and m are positive integers of 1 or more and n is a positive integer of 2 or more;
   a magnetic-material member for closing the magnetic path of said field magnet; and
   an armature having l(2n−1) armature windings disposed thereon within said magnetic path in a non-superposed manner with respect to each other and in a face-to-face relationship with respect to said field magnet poles, said windings each being formed such that the angular spacing of those conductor portions thereof that contribute to the generation of torque is equal to the angular width of said field magnet poles.

2. A direct current motor according to claim 1 wherein terminals of said l(2n−1) armature windings are connected to corresponding ones of l(m+n)(2n−1) commutator segments which are interconnected in common l(m+n) by l(m+n), further including brushes in sliding contact with said commutator segments for supplying current to said armature windings from a positive and a negative terminals of a direct current supply source, and said brushes, which contact respectively with ones of said commutator segments, are angularly spaced from each other by 360°/l(2m+2n) or by an angle between the commutator segments which are interconnected respectively in common with said ones of the commutator segments.

* * * * *